UNITED STATES PATENT OFFICE.

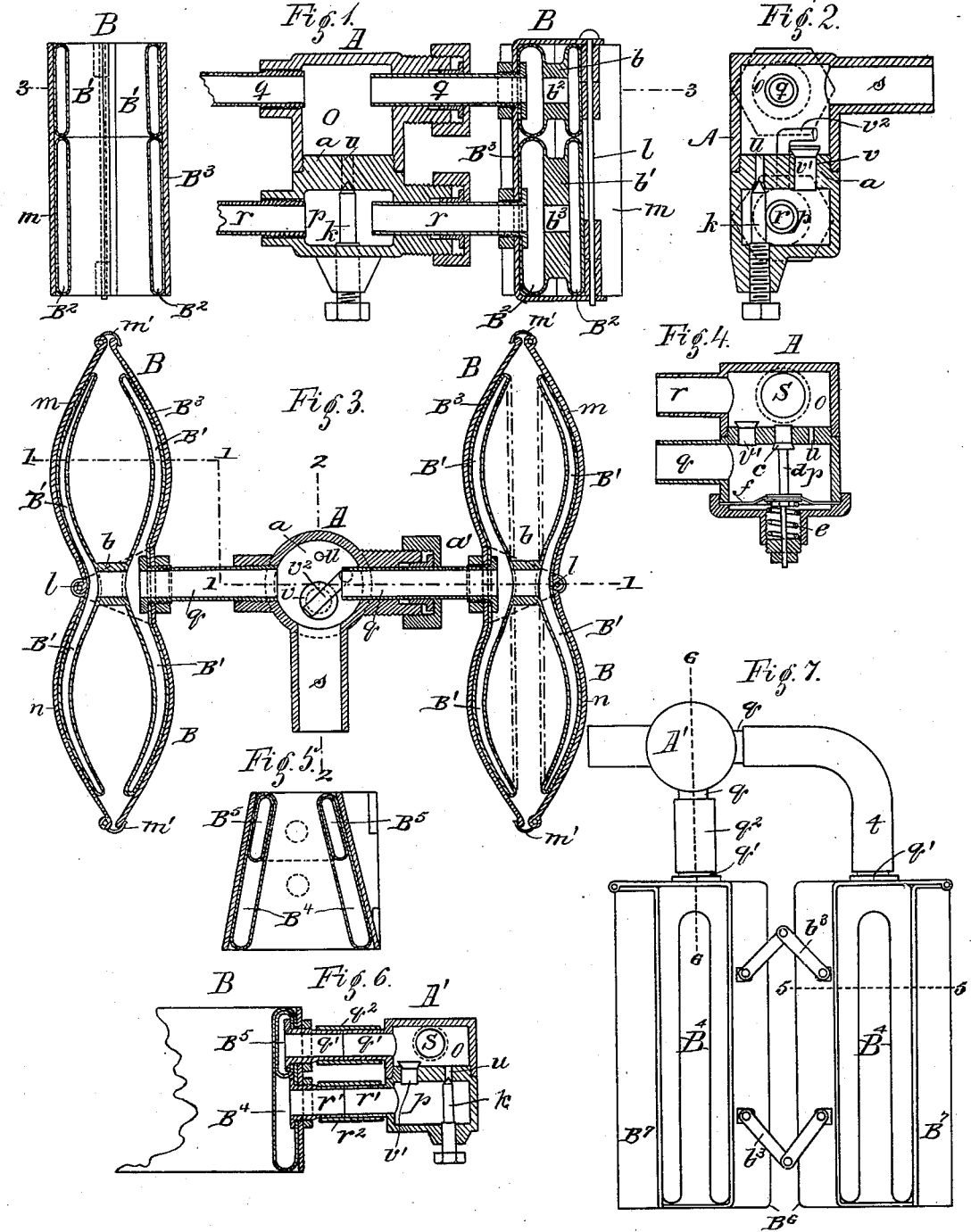

CARL B. STRÓYBERG, OF ROSKILDE, DENMARK.

MILKING-MACHINE.

SPECIFICATION forming part of Letters Patent No. 579,847, dated March 30, 1897.

Application filed March 24, 1896. Serial No. 584,705. (No model.)

*To all whom it may concern:*

Be it known that I, CARL B. STRÓYBERG, manufacturer, of Roskilde, Denmark, have invented certain new and useful Improvements in Milking-Machines, of which the following is a specification.

The invention is designed to produce a milking-machine in which the pressure exerted by air-cushions will serve to effect the milking action, and, further, to initially exert a pressure on the teats at the bases thereof, and, finally, press on the teats along the length of the same for effecting the milking action; and the invention consists in devices operating to accomplish these objects, as hereinafter particularly described, and defined in the claims.

Reference is to be had to the accompanying drawings, forming a part of this specification, in which similar characters of reference indicate corresponding parts in all the figures.

Figure 1 is a vertical sectional view of a milking-machine embodying my invention, the section being taken on the irregular line 1 1 of Fig. 3. Fig. 2 is a detail cross-sectional view on line 2 2 of Fig. 3. Fig. 3 is a sectional plan view, the section being taken on line 3 3 of Fig. 1. Fig. 4 is a detail, in vertical section, illustrating a modification of the chambered air-receiver. Fig. 5 is a detail vertical section showing a modification of the inflatable pressure devices for the teats, the section being taken on line 5 5 of Fig. 7. Fig. 6 is a section on line 6 6 of Fig. 7, and Fig. 7 is a plan view of the apparatus shown in section in Figs. 5 and 6.

In constructing a milking apparatus embodying my invention a casing A is provided and chambered to receive and distribute compressed air from an air-pump, (not shown,) and in connection with this casing receivers B are provided and suitably incased and constructed to be inflated by air from the chambered casing A. The casing A has an upper chamber $o$ and a lower chamber $p$, separated by a partition $a$, an inlet or supply nipple $s$, leading to chamber $o$, the inlet being adapted for connection with an air-pump or the like. Communication is established between the chambers $o$ and $p$ by a port or orifice $u$, which is controlled by a conical plug or valve $k$, which is threaded into the casing A at the bottom and extends into port $u$, the said valve being thereby adjustable to increase or decrease the amount of air passing through said port. A second and larger port or orifice $v$ is formed in partition $a$ and receives a gravity or equivalent valve $v'$, that normally closes the said orifice, the upward movement of valve $v'$ being limited by a suitable keeper $v^2$.

The teat-receivers B, of which there are usually four, consist of hollow inflatable sections $B'$ $B^2$, of leather, rubber, or the like, having a casing $B^3$, the sections $B'$ forming inflatable pressure devices for the upper ends or bases of the teats, while the lower sections $B^2$ are separately inflatable and are adapted to press the lower ends and greater portion of the teats. The hollow sections $B'$ $B^2$ are respectively arranged in pairs, as will be seen best from Fig. 3, each pair being adapted to receive a teat, and said sections extend laterally from central blocks or thickened portions $b$ $b'$, having transverse passages $b^2$ $b^3$, which establish communication between opposite sections. The teat-receivers are connected with the casing A by means of tubular connections $q$ $r$, which at their outer ends enter the inflatable sections $B'$ $B^2$, respectively, and at their inner ends enter the chambers $o$ and $p$, the connections $q$ $r$ of one set of receivers entering said chambers through stuffing-boxes $a'$, whereby they may be moved to adjust the teat-receivers to conform to the distance between the forward and hind teats of the cow.

The casing $B^3$ has its outer sides $m$ $n$ hinged, as at $l$, and the said hinged members have spring-latches $m'$ or equivalent devices for engagement with the stationary parts of the casings. This arrangement permits the ready application of the apparatus to the udder.

The casings $B^3$ are given a lenticular form at each side of the centers to maintain the inflatable sections or receivers proper, $B'$ $B^2$, in corresponding shape, and thus when the sections are inflated a sufficient pressure will be exerted to effect the milking, while harsh pinching is avoided, since the sections leave a space at the outer end for the teat to accommodate itself to the contracting space.

In operation air under pressure enters the chamber o from supply-pipe s and passes directly to the several upper sections B', through connections q, inflating the same and thereby pressing against the teats at the bases thereof to effect a closure of the same. The air at the same time passes in less volume through the part u to chamber p, and thence to the inflatable sections B², and gradually inflates the latter, thereby forcing the milk from the teats. When now the pump is drawn back, the air will be withdrawn from the inflated receivers B' B², the air from the lower receivers and lower chamber p passing through orifice v, as readily will be understood, and thus the actions are repeated until the milking is completed, the milk being received in any suitable pail or vessel placed beneath the machine.

In the modification shown in Fig. 4 there is a valve c, closing a third port or orifice, in addition to the ports u and v, said valve c having a stem d, which is acted on by spring e and diaphragm f, the said valve c being adapted to open and equalize the pressure in the two chambers o p when the pressure overcomes the spring e.

In the form of apparatus shown in Figs. 5, 6, and 7 the lower inflatable sections B⁴, which exert pressure on the lower ends and for the greater portion of the teats, are continued around the sections B⁵, which initially exert pressure on the upper ends. By thus continuing the sections B⁴ a continuous contact-surface is provided and no space is left between the upper and lower sections. The inflatable sections B⁴ B⁵ have separate connections for conducting air thereto, substantially as before described. In this modification, however, the teat-receivers, instead of being supported at opposite sides of the chambered casing A', are all at the one side, as will be seen best from Fig. 7, and the casings B⁶ of the receivers are adjustably connected by lazy-tongs b³ and are provided with hinged sides B⁷. The connection of the upper and lower inflatable sections B⁴ B⁵ of one receiver with the chambered casing A' is effected by nipples q' q' r' r', which are coupled by sleeves q² r², while the connection with the inflatable sections of the companion receiver is effected by hose t and nipples q'. In this modification each receiver accommodates two teats, instead of having a separate receiver for each teat.

Having thus described my invention, I claim as new and desire to secure by Letters Patent—

1. A milking-machine having teat-receivers comprising upper and lower inflatable sections, and means for inflating said sections alternately, substantially as described.

2. A milking-machine having upper and lower inflatable sections adapted to be inflated independent of each other, and means for inflating the sections, the upper sections being adapted to be first inflated whereby the said upper sections will initially exert their pressure, substantially as described.

3. A milking-machine having inflatable receivers for the teats of the cow, said receivers comprising upper and lower sections separately inflatable and serving to exert pressure on the teats of the cow, means for inflating the sections and casings for said inflatable receivers, substantially as described.

4. In a milking-machine, the combination of receivers comprising upper and lower inflatable sections, a casing having an inlet for compressed air, and separate connections between the said casing and the interior of the upper and lower inflatable sections, substantially as described.

5. In a milking-machine, the combination of the teat-receivers comprising upper and lower inflatable sections, a chambered casing for receiving compressed air, the chambers being in communication through valved orifices, and separate connections respectively between said chambers and the upper and lower inflatable sections, substantially as described.

6. In a milking-machine, the combination of the teat-receivers comprising inflatable sections, a casing adapted to receive a supply of compressed air, and connections between the interior of the casing and the inflatable sections, the said connections permitting the adjustment of the receivers relatively to the casing that supplies the air, substantially as described.

7. A milking-machine having teat-receivers comprising casings each having one of its sides hinged and interior flexible sections movable to contract the space within the casings, substantially as described.

8. A milking-machine having teat-receivers comprising lenticular casings having hinged sides, fastening devices for securing the hinged sides to the stationary parts of the casings, inflatable sections held within the casings, and means for inflating the sections, substantially as described.

9. A milking-machine having teat-receivers, comprising casings having hinged parts, fastening devices for said hinged parts and inflatable sections located within the casings and forming spaced sides, the said sides being separated from each other at their outer ends forming openings leading to the space between the sides, substantially as described.

In testimony that I claim the foregoing as my invention I have signed my name in presence of two subscribing witnesses.

C. B. STRÖYBERG.

Witnesses:
 ROBT. J. KIRK,
 N. STRUYLING.